United States Patent [19]

Ito et al.

[11] 4,097,287

[45] Jun. 27, 1978

[54] INORGANIC FILM FORMING COMPOSITION FOR COATING

[75] Inventors: Hitoshi Ito; Hideo Kogure, both of Hiratsuka, Japan

[73] Assignee: Kansai Paint Co., Ltd., Japan

[21] Appl. No.: 719,728

[22] Filed: Sep. 2, 1976

[30] Foreign Application Priority Data

Sep. 4, 1975 Japan .............................. 50-106524
Apr. 8, 1976 Japan .............................. 51-39666

[51] Int. Cl.$^2$ .............................................. C09D 5/08
[52] U.S. Cl. ............................ 106/14.14; 106/15 FP; 106/287.17; 252/8.1
[58] Field of Search .................. 106/15 FP, 14, 287 S, 106/1; 252/8.1

[56] References Cited

U.S. PATENT DOCUMENTS

| | | | |
|---|---|---|---|
| 3,248,251 | 4/1966 | Allen | 106/1 |
| 3,320,082 | 5/1967 | McMahon et al. | 106/14 |
| 3,920,578 | 11/1975 | Yates | 106/287 S |

*Primary Examiner*—Lorenzo B. Hayes
*Assistant Examiner*—Amelia B. Yarbrough
*Attorney, Agent, or Firm*—Ostrolenk, Faber, Gerb & Soffen

[57] ABSTRACT

An inorganic film forming composition used for forming noncombustible coating films which have good adhesiveness and various other excellent properties. The composition comprises: colloidal silica dispersion, water-soluble organic amines, powdery aluminium compounds and powdery glasses and further may comprise water-soluble amino acids, thiourea, urea and water soluble salts of transition metals such as Cr, Mo, W, Fe, Co, Mn, V, etc. for forming a vehicle.

15 Claims, No Drawings

INORGANIC FILM FORMING COMPOSITION FOR COATING

BACKGROUND OF THE INVENTION

(1) Field of the Invention

This invention relates to an inorganic film-forming composition. More particularly, the invention relates to a coating composition which is used for the formation of noncombustible coating films curable at ambient tmeperature and being excellent in hardness, film-forming property, high-build coating, abrasion resistance, weather resistance and water resistance and overcoating films applicable on inorganic zinc-rich paint coatings.

(2) Description of Prior Art

Water-dispersible vinyl polymers have hitherto been used for various purposes since they scarcely contain organic solvents and are excellent in film-forming property.

They are, however, mainly composed of organic materials so that they are liable to be burnt up by fire, and they cannot meet the recent requirements of non-flamability of coatings for high buildings and so forth.

Further, when such an organic coating composition is applied over an inoroganic zinc-rich paint coating, the adhesion between the layers of the organic coating and the zinc-rich paint coating becomes poor because the surface of zinc-rich paint coating is prone to be strongly basic. In addition, as the essential nature, the organic coating composition leaves much to be improved in view of the organic-solvent resistance, heat resistance, impact resistance and chemical resistance (acids, alkali and the like). Furthermore, they are relatively soft, and therefore, they are subject to restriction in the uses in which abrasion resistance is required.

In order to eliminate the above-mentioned disadvantages caused in the organic coating compositions, inorganic binders of water-soluble alkali silicates are employed as coating materials or binders. The alkali silicates have particular properties as inorganic compounds, such as strong adhesiveness and binding property, excellent chemical resistance and noncombustibility, and high hardness, however, since the water-soluble alkali silicates are high in alkali metal ions and the considerable amount of contained siloxane bonds are cut in proportion to the quantity of the alkali metal ions, the coating films obtained by applying water-soluble alkali silicates and by drying at ambient temperature is generally poor in water resistance. That is, the coating film has the defect that it becomes soft and is likely to dissolve in water. In order to eliminate this defect, the inventors applied "Inorganic Coating Compositon" (Jap. Appln. 50-106522, etc.) which comprises colloidal silica and aluminium compound, however, the inorganic coating is likely to form cracks on the surface of the film when more than 500 microns in film thickness is applied.

BRIEF DESCRIPTION OF THE INVENTION

In view of the above-disclosed disadvantages in the conventional art, the primary object of the present invention is to provide an improved film forming composition for forming noncombustible coating films.

Another object of the present invention is to provide an inorganic film forming composition for forming coating films that have good adhesiveness to the conventional zinc-rich paint coatings.

A further object of the present invention is to provide an inorganic film forming composition for forming coating films that have excellent water resistance, abrasion resistance and other chemical resistance and mechanical properties.

According to the present invention, the film forming composition of the present invention consists of a vehicle, powdery aluminium compound and powdery glass, and the vehicle comprises: (A) an aqueous dispersion of colloidal silica and (B) water-soluble organic amines, and further may comprise, (C) water-soluble amino acids, thiourea, urea and one or more compounds selected from water-soluble salts of transition metals such as Cr, Mo, W, Fe, Co, Mn, V, etc.

DETAILED DESCRIPTION OF THE INVENTION

In the present invention, the weight ratio of the above-mentioned component (B) to the silica contained in the component (A) (amines:$SiO_2$) is 1:100 to 2:1, the water-soluble amino acid in the component (C) is not more than 15% by weight against water contained in the vehicle, the molar ratio of metallic ions to silica in the component (A) metallic ions such as Cr, Mo, W, etc. (ions/$SiO_2$) is not more than 1/50, thiourea is not more than 10% by weight to water in the vehicle, and urea is not more than 55% by weight to water in the vehicle.

The advantages of the inorganic coating films formed according to the present invention as compared with the above-mentioned ones obtained from the conventional coating compositions, are that the film-forming property, high-build coating ability and curing property are good, the abrasion resistance is very good, water resistance, solvent resistance, chemical resistance and adhesion of cured coating films are much improved, and the coating film is noncombustible even when it is burnt by gas flames.

Further, since the greater part of or all of the film-forming composition of the present invention consist of inorganic compounds, the above-mentioned defects inevitably caused by the organic compounds can be eliminated and the adhesion to the inorganic zinc-rich coating is very good when as the composition of the present invention is applied thereon with the combination of inorganic to inorganic materials.

The colloidal silica aqueous dispersion (A) used for the composition of the present invention contains about 10 to 50% by weight of $SiO_2$, and it may contain not more than 1% by weight of sodium ion calculated as $Na_2O$ and trace amounts of alkali metal ions such as lithium ion and potassium ion.

Further, the silica particles in the colloidal silica aqueous dispersion is very small and the desirable size of the particles may be in the range of 1 to 100 m$\mu$. Such alkali-stabilized aqueous dispersions of colloidal silica will be exemplified in the following.

| Trade Name | Maker | Solid (wt.%) | pH |
|---|---|---|---|
| Snowtex 30 | Nissan Chemical Industries, Ltd. | 30 | 10.0 |
| Snowtex 20 | " | 20 | 9.5 |
| Snowtex 20L | " | 20 | 10.5 |
| Ludox HS 40 | E.I. du Pont de Nemours & Co. Inc. | 40 | 9.7 |
| Ludox L.S | " | 30 | 8.4 |
| Cataloid-S 20H | Catalyst & Chemicals Industries Co., Ltd. | 20 | 10.0 |
| Cataloid-S 20L | " | 20 | 10.0 |
| Cataloid-S 30H | " | 30 | 9.0 |

| Trade Name | Maker | Solid (wt.%) | pH |
|---|---|---|---|
| Cataloid-S 30L | " | 30 | 9.0 |

Examples of water soluble lithium salt are lithium hydroxide, lithium polysilicates, etc.

Exemplified as the water-soluble organic amines are monoethanolamine, diethanolamine, isopropanolamine, ethylenediamine, isopropylamine, diisopropylamine, morphorine, triethanolamine, diaminopropane and aminoethyl ethanolamine. Further, the water-soluble amino acids may be exemplified by glycine, alanine, aminobutyric acid, valine, norleucine, norvaline and serine. Further, it is possible to use other amino acids that are water-soluble and amphoteric or basic.

Thiourea used in the invention is represented by the general chemical formula: $H_2NCSNH_2$ and urea, by the general chemical formula: $H_2NCONH_2$.

Furthermore water-soluble salts of transition metals such as Cr, Mo, W, Fe, Co, Mn, V, etc., can be admixed with the colloidal silica aqueous dispersion of the present invention so as to improve the curing property and the water resistance of the coating. Examples of these salts are potassium dichromate, sodium dichromate, potassium chromate, sodium chromate, ammonium chromate, potassium molybdate, sodium molybdate, potassium tungstate, sodium tungstate, potassium vanadate, sodium vanadate, sodium cobaltic nitrite, cobalt acetate, ammonium cobalt nitrate, ammonium cobalt phosphate, cobalt hydroxide, cobalt pottasium sodium nitrite, manganese oxide, ammonium iron sulfate, iron acetate and ammonium iron (II) oxalate. They can be used solely or as a mixture.

The quantity of water-soluble organic amine used in the present invention is 1:100 to 2:1 in weight ratio to the silica contained in the vehicle (amines:$SiO_2$). In the case that the quantity of amine to silica is less than 1:100, the water resistance of formed coating film becomes poor. When the quantity of amine is more than the above range, the coating composition becomes stimulative and it is not desirable for workers since the compositon irritates the skins, hands, eyes and noses of them. Therefore, the preferable weight ratio of amine to silica is 1:25 to 1:2. The quantity of water-soluble amino acid is not more than 15% by weight to water contained in the vehicle, and When it exceeds 15% by weight, the shelf life of obtained coating composition becomes short and accordingly, the application work is not easy.

The quantity of thiourea used in the present invention may be less than 10% by weight to water contained in the vehicle. When more than 10% by weight of thiourea is used, thiourea separates out on the surface of formed coating film so that the surface state of the coating becomes poor.

With regard to one or more compounds selected from water soluble salts of transition metals such as Cr, Mo, W, Fe, Co, Mn, V, etc., the molar ratio of chromium ion, molybdenum ion, tungsten ion, etc. to the dry basis silica (one or more ions selected from chromium ion, molybdenum ion, tungsten ion, etc./$SiO_2$) may be not more than 1/50.

When the quantity of the ion is within the above limit, the ion can improve the shelf life of the coating composition, however, when the ratio of ion is more than 1/50, the ion reacts with the silanol groups (—SiOH) existing on the surface of each colloidal particle and gelation is caused to occur by the aggregation of each colloidal particle.

Additionally, a water soluble or water dispersible organic resin may be used in combination with the organic coating composition in order to improve the flexibility of the film.

When the powdery aluminium compounds of the average particle size of 1 to 100 microns are used in the present invention, the coating film can be prevented from cracking, the shelf life and the appliable time can be prolonged. "Alumina A12" (Trade mark of $Al_2O_3$ having a specific gravity of 3.96 and a particle size of about 44 to about 70 microns, product of Showa Denko K. K., Japan) and "Alumina A42" (Trade mark of $Al_2O_3$ having a specific gravity of 3.95 and a particle size of about 1 to about 15 microns, product of Showa Denko, K. K., Japan) are exemplified as such useful powdery aluminium compounds.

As the powdery aluminium compound used in the present inventin, the powders of aluminium oxide, aluminium hydroxide, aluminium silicate, potassium aluminium silicate, calcium aluminium silicate, calcined products of the other metallic oxides (e.g. titanium dioxide and silicon dioxide) and compounds thereof and inorganic pigments treated by aluminium compounds on the surface thereof (e.g., titanium dioxide coated by aluminium hydroxide) are exemplified. They can be used solely or as a mixture. The weight ratio of the vehicle component to the aluminium compound powder ($SiO_2$/powdery aluminium compound) is preferably in the range of 1/50 to 5/1, and more preferably from 1/10 to 4/1.

The average particle size of the aluminium compound powder may be 1 to 100 microns, and preferably in the range of 3 to 50 microns.

The present invention is especially characterized in that the inorganic film forming composition contains powdery glass which is one or the mixture of powdery glass fibre and powdery glass flake in addition to the above mentioned inorganic vehicle, powdery aluminium compound, etc.

The powdery glass fibre is defined as a glass fibre pulverized having 1 to 15 microns in diameter and the powdery glass flake as a product of alkali vitreous silicate having 3 to 4 microns in thickness.

The powdery glass is used in order to improve a film-forming property and high-build coating ability of the inorganic coating composition of the present invention.

The weight ratio of the powdery glass to the powdery aluminium compound used (the powdery glass/the powdery aluminium compound) is in the range of 1/40 to 5/1 and preferably from 1/20 to 1/1. The weight ratio of the powdery glass to the powdery aluminium compound used, if more than 5/1, impairs the curing property of obtained coating composition, and if less than 1/40, the cracks of coating film cannot be prevented from occurring.

Samples of these powdery glasses are "NEG Glass Powder" (trade mark of glass flake, product of Nippon Electric Glass Co. Ltd., Japan), "Glass Ion Flake GF-C64" (trade mark of powdery glass flake, product of Asahi Fibre Glass Co., Ltd., Japan) and "Micro Glass ES-03" (trade mark of powdery glass fibre, product of Nippon glass Fibre Co., Ltd., Japan).

The average particle size of the powdery glass may be 1 to 100 microns and preferably in the range of 3 to 50 microns. The cracks of coating film can be prevented from occurring when the material having the particle size within said range is used.

A lysine finish for decorative use can be produced by admixing an aggregate comprising $CaCO_3$ or $SiO_2$ with the inorganic coating composition of the present invention. The average particle size of the aggregate is preferably in the range of 0.3 to 3 mm in diameter, and more preferably 0.5 to 2 mm.

In the case that the inorganic coating composition of the present invention is used for protecting the surfaces of metals, especially those of iron and steel, it is advantageous for improving corrosion resistance to mix the powdery aluminium compound with finely ground metallic powders such as zinc powder and lead powder, lead oxide powder, lead chromate powder, zinc oxide powder, iron oxide powder or the like.

In order to color the coating film formed by using the composition of the present invention, titanium dioxide, carbon black and other various coloring pigments can be added to the composition. Further, in order to improve the applicating property of the composition, inert extenders used for common paints such as clay, mica, talc, silicates, and carbonates of alkaline earth metals can be employed.

Further, the film forming composition of the present invention has excellent adhesion to glass substrates, slate substrates, concrete substrates, iron and steel substrates and zinc-rich paint coating films.

In order that those skilled in the art may better understand the present invention and the manner in which it may be practised, the following specific examples are given. It should be noted that the examples are only illustrative but by no means restrictive of the invention. In the examples, unless otherwise indictated, parts and percents are by weight.

EXAMPLES 1 TO 5

The kinds and quantities of vehicle components are shown in Table 1, which components were mixed according to the conventional method. Nonvolatile matter in the obtained mixture were made 30% by diluting with water, and then powdery aluminium compound, powdery glass and pigment were added thereto and mixed in the conventional method according to Table 2 to obtain inorganic film forming compositions. Each composition was sprayed over slate plates by using a spray gun so as to form coating films of 70 microns in dried thickness. The above inorganic film forming compositions were likewise sprayed over steel plates that were previously coated by inorganic zinc-rich paint (trade mark: SD Zinc Primer ZE 1500N made by Kansai Paint Co., Ltd.) to form coating films of 100 microns in dried thickness. After the drying of thus obtained plates, the plates were subjected to several property tests. The results of the tests on the coated slate plates are shown in Table 3 and the results of the tests on other test plates in which the compositions were applied over inorganic zinc-rich coating, are shown in the following Table 4.

COMPARATIVE EXAMPLE 1

To 100 parts of "Snow tex 30" (trade mark of colloidal silica aqueous dispersion, product of Nissan Chemical Industries, Ltd., Japan) were added 60 parts of "Alumina A 12" (trade mark of $Al_2O_3$, product of Showa Denko K. K., Japan) and 4.5 parts of "Titane White RD" (trade mark of $TiO_2$, product of Ishihara Sangyo Kaisha Ltd., Japan) and the mixture was fully stirred at 80° C for 5 hours with the supply of nitrogen gas to obtain a viscous coating fluid. This mixture was applied to the surface of slate plates and steel plates in like manner as foregoing Examples 1 to 9 and the plates were dried likewise to obtain test plates.

COMPARATIVE EXAMPLE 2

A mixture of 100 parts of polyvinyl alcohol (polymerization degree : 1000), 1000 parts of water, 6 parts of potassium persulfate and 45 parts of vinyl acetate was prepared in the same manner as shown in Comparative Example 1. A viscous emulsion having a viscosity of Z (Gardner viscometer at 20° C) was obtained. This emulsion was applied to the surfaces of slate plates and steel plates in like manner as the foregoing Examples 1 to 9 and the plates were dried likewise to obtain test plates.

COMPARATIVE EXAMPLE 3

A coating composition was prepared in the same manner as Example 1 except using an aqueous solution of 40% sodium silicate ($Na_2O.2.5SiO_2$). The composition was then applied to the surfaces of slate plates and steel plates in like manner as Examples 1 to 9 and the coated plates were dried likewise to obtain test plates.

The results of the property tests on the test plates of Comparative Examples 1, 2 and 3 are shown in Table 3.

COMPARATIVE EXAMPLE 4

In like manner as Example 1, epoxy resin paint (extender: pigment = 1:2.2, epoxy resin polyamide hardener) was applied to zinc-rich paint coatings similar to those in Example 1 and the coated plates were dried likewise to obtain test plates. The results of tests are shown with those of Comparative Example 1 in the following Table 4.

Table 1

| Compositions | Components | Ratios of Materials | Examples of Vehicle Component | | | | |
|---|---|---|---|---|---|---|---|
| | | | 1V | 2V | 3V | 4V | 5V |
| Vehicles | | | | | | | |
| Aqueous dispersion of colloidal silica | Snowtex 30 | | 100 | | | | 100 |
| | Ludox HS 40 | | | 100 | | 100 | |
| | Cataloid-S 30L | | | | 100 | | |
| Water-soluble organic amines | Monoethanolamine | Amines:$SiO_2$ (Weight ratio) | 1:3 | 1:2 | 1:1.5 | 1:1 | 1:3 |
| | Isopropanolamine | | | | | | |
| | Ethylenediamine | | | | | | |
| Water-soluble amino acids | Glycine | Weight %/$H_2O$ | | 2 | | | 2 |
| | Amino butylic acid | | | | 4 | | |
| Urea | $(NH_2)_2CO$ | Weight %/$H_2O$ | | | | 5 | 5 |
| Thiourea | $(NH_2)_2CS$ | Weight %/$H_2O$ | | | | | 5 |
| Alkali metal salts or ammonium salts of chromic acid, molybdic acid or tungstic acid | $K_2Cr_2O_7$ | Cr,Mo or W:$SiO_2$ | | | | | 1:250 |
| | $Na_2MoO_4 \cdot 2H_2O$ | | | 1:500 | | | |
| | $Na_2WO_4 \cdot 2H_2O$ | | | | 1:1000 | | |
| | $(NH_4)_2CrO_4$ | | | | | 1:150 | |

Table 2

| Compositions | Components | Ratio of Materials | Examples 1 | 2 | 3 | 4 | 5 | 6 | 7 | 8 | 9 |
|---|---|---|---|---|---|---|---|---|---|---|---|
| Vehicles: | 1V | | | | | | 100 | | | | 100 |
| | 2V | | 100 | 100 | 100 | 100 | | | | | |
| | 3V | | | | | | | 100 | | | |
| | 4V | | | | | | | | 100 | | |
| | 5V | | | | | | | | | 100 | |
| Powders: | "Alumina A 12"*1 | Weight ratio of compound used to vehicle | 120 | 120 | 120 | | 45 | | | | |
| Powdery Aluminium Compound | "Alumina A 42"*1 | | | | | 75 | | | | | |
| | Aluminium hydroxide | | | | | | | 38 | | | |
| | Aluminium silicate | | | | | | | | 70 | | |
| | Potassium aluminium Silicate | | | | | | | | | 90 | |
| | Calcium aluminium Silicate | | | | | | | | | | 120 |
| Powdery glass: | "NEG Glass Powder"*2 | Weight ratio of powdery glass used to aluminium compound powder | 4.5 | | | 12 | 9.0 | 3.0 | | 15 | |
| | "Glass Ion Flake GF-C64"*3 | | | 3.0 | | | | | 30 | | |
| | "Micro Glass ES-03"*4 | | | | 2.4 | | | | | 9.0 | |
| Combined pigments: | Titanium dioxide | Weight ratio of pigment used to vehicle | 6.0 | 4.5 | 4.5 | 9.0 | 6.0 | | 4.8 | 6.0 | |
| | Iron red oxide | | | | | | | 6.0 | | | 6.0 |
| | Talc | | | | | | | | | | |

Remarks:
*1Trade mark of Al$_2$O$_3$, product of Showa Denko K.K., Japan
*2Trade mark of glass flake, product of Nippon Electric Glass Co., Ltd., Japan
*3Trade mark of powdery glass flake, product of Asahi Fibre Glass Co., Ltd., Japan
*4Trade mark of powdery glass fibre, product of Nippon Glass Fibre Co., Ltd., Japan.

Table 3

| Items | Test Conditions (*1) Drying Time of Coating Film | Duration of Test | Examples 1 | 2 | 3 | 4 | 5 | 6 | 7 | 8 | 9 | Comparative Examples 1 | 2 | 3 |
|---|---|---|---|---|---|---|---|---|---|---|---|---|---|---|
| Curing Property (*2) | 1 day 30 days | — — | B 3H | H 4H | H 5H | 2H 5H | 3H 5H | 2H 4H | 2H 5H | HB 3H | B 3H | 2H 4H | 6B B | 2B 4H |
| Water Resistance (20° C) | 24 hrs. | 24 hrs. | Good | Good | Good | Good | Good | Good | Good | Good | Good | Good | Blisters | Softening |
| Burning (*3) | | — | Non com-bustible | Non com-bustible | Non com-bustible | Non com-bustible | Non com-bustible | Non com-bustible | Non com-bustible | Non com-bustible | Non com-bustible | Non com-bustible | Burn out | Non com-bustible |
| Test Adhesive | 24 hrs. | — | 100/100 | 100/100 | 100/100 | 100/100 | 100/100 | 100/100 | 100/100 | 100/100 | 100/100 | 0/100 | 10/100 | 50/100 |
| property (*4) Impact (*5) Resistance | 5 hrs. 24 hrs | — — | Good | Good | Good | Good | Good | Good | Good | Good | Good | Cracks | Cracks | Cracks & blisters |

(*1) The compositions indicated in the foregoing Tables 1 and 2 and the compositions disclosed in Comparative Examples 1, 2 and 3 were applied on the surfaces of the above-mentioned slate plates and then dried. Thus obtained coated plates were subjected to several tests. "Duration of Test" in Table 3 indicates the time period in which the test plates were immersed in water.
(*2) The values are pencil hardnesses after the exposure at 20° C and 75% relative humidity for 1 day, and outdoor exposure for 30 days.
(*3) By heating with a Bunsen burner for 3 minutes, the state of burning of coating film was observed.
(*4) On the surface of coating film, two sets of eleven notch lines having intervals of 1 mm and perpendicular to each other which reach the surface of the substrate were formed by a knife. Thereby 100 small squares (1 × 1 mm) were cut on the coating film. Then a self-adhesive tape was applied to the surfaces of cut squares with pressure and the tape was rapidly peeled off. The remaining cut squares of the coating film were counted (the numerators of the data indicate the numbers of squares that are not peeled off).
(*5) According to the Item B of 6.13 Impact Resistance in General Testing Methods for Paints of JIS K 5400 (Japanese Industrial Standards K 5400). A weight of 500 ± gr was dropped on a impact frame from the predetermined height (50 cm) which is particular to the kind of coating film, and the state of tested coating film was observed.

Table 4

| Items | Test conditions (*1) Drying Time of Coating Film | Duration of Test | Examples 1 | 2 | 3 | 4 | 5 | 6 | 7 | 8 | 9 | Comparative Examples 1 | 4 |
|---|---|---|---|---|---|---|---|---|---|---|---|---|---|
| Curing (*2) Property | 1 day | — | B | H | H | 2H | 3H | 2H | 2H | HB | B | 2H | 4B |
|  | 30 days | — | 3H | 4H | 5H | 5H | 5H | 4H | 5H | 3H | 3H | 4H | H |
| Water Resistance (20° C) | 24 hrs | 480 hrs | Good | Good | Good | Good | Good | Good | Good | Good | Good | Softening | Blisters |
| Sea Water Resistance | 24 hrs | 480 hrs | Good | Good | Good | Good | Good | Good | Good | Good | Good | Softening | Blisters |
| Solvent (*3) Resistance (20° C) | 24 hrs | 24 hrs | Good | Good | Good | Good | Good | Good | Good | Good | Good | Good | Dissolution & Blisters |
| Chemical (*4) Resistance |  |  |  |  |  |  |  |  |  |  |  |  |  |
| 5% NaOH | 24 hrs | 24 hrs | Good | Good | Good | Good | Good | Good | Good | Good | Good | Softening | Blisters |
| 5% HCl | 24 hrs | 24 hrs | Good | Good | Good | Good | Good | Good | Good | Good | Good | '' | '' |
| Adhesive (*5) Property | 24 hrs | — | 100/100 | 100/100 | 100/100 | 100/100 | 100/100 | 100/100 | 100/100 | 100/100 | 100/100 | 0/100 | 50/100 |
| Impact Resistance (%5) | 24 hrs. | — | Good | Good | Good | Good | Good | Good | Good | Good | Good | Cracks | Cracks & Blister |

(*1) The compositions indicated in the foregoing Tables 1 and 2 and the composition disclosed in Comparative Examples 1 and 4 were applied on the surfaces of the above-mentioned inorganic zinc-rich paint coatings and they were then dried. The thus obtained test plates were subjected to several tests. "Duration of Test" in Table 4 indicates the time period in which the test plates were immersed in water, sea water, solvents and chemicals.
(*2) The values are pencil hardnesses after the exposure at 20° C and 75% relative humidity for 1 day, and outdoor exposure for 30 days.
(*3) The results of immersions in toluene at 20° C for 24 hours are shown.
(*4) The indicated results were obtained by immersing in 5% NaOH aqueous solution and 5% HCl aqueous solution.
(*5) On the surface of coating film, two sets of eleven notch lines having intervals of 1 mm and perpendicular to each other which reach the surface of the substrate were formed by a knife. Thereby 100 small squares (1 × 1 mm) were cut on the coating film. Then a self-adhesive tape was applied to the surfaces of cut squares with pressure and the tape was rapidly peeled off. The remaining cut squares of the coating film were counted (the numerators of the data indicate the numbers of squares that are not peeled off).

From the above test results, it will be understood that the compositions of the present invention are excellent in various properties.

It should be emphasized, however, that the specific examples described herein are intended as merely illustrative of the invention. It is preferred, therefore, that the present invention be limited not by the specific disclosure herein, but only by the appended claims.

What is claimed is:

1. An inorganic film forming composition particularly adapted for use as a coating over a zinc rich coating which consists essentially of:
   (A) colloidal silica dispersed in water in an amount of about 10-50% by weight as $SiO_2$;
   (B) at least one water soluble organic amine selected from the group consisting of monoethanolamine, diethanolamine, isopropanolamine, ethylenediamine, isopropylamine, diisopropylamine, morphorine, triethanolamine, diaminopropane and aminoethyl ethanolamine in a weight ratio of amine to silica of 1:100 to 2:1;
   (C) at least one powdery aluminum compound selected from the group consisting of aluminium oxide, aluminum hydroxide, aluminum silicate, potassium aluminium silicate, calcium aluminum silicate, calcined products of other metallic oxides and inorganic pigments treated by aluminum compounds on the the surface thereof, in a weight ratio of $SiO_2$ to powdery aluminum compound of 1:50 to 5:1;
   (D) powdery glass having an average particle size of 1 to 100 microns;
   (E) up to 15 weight percent based on the weight of the water of at least one water soluble amino acid selected from the group consisting of glycine, alanine, aminobutyric acid, valine, norleucine, norvaline and serine;
   (F) up to 10% by weight based on the weight of water of thiourea;
   (G) up to 55% by weight based on the weight of water of urea; and
   (H) up to a molar ratio to silica of 1:50 of at least one water soluble salt of a transition metal or potassium, sodium or ammonium salt of said transition metal wherein said transition metal selected from the group consisting of chromium, molybdenum, tungsten, iron, cobalt, manganese and vanadium.

2. An inorganic film forming composition according to claim 1, wherein the colloidal silica particle size is in the range of 1 to 100 m$\mu$.

3. An inorganic film forming composition according to claim 1, wherein said powdery aluminium compound has an average particle size of 1 to 100 microns.

4. An inorganic film forming composition according to claim 1, wherein said water soluble salt of a transition metal is at least 1 member selected from the group consisting of cobalt acetate, cobalt hydroxide, manganese oxide, and iron acetate.

5. An inorganic film forming composition according to claim 4, wherein said powdery aluminum compound average particle size is 3 to 50 microns.

6. An inorganic film forming composition as claimed in claim 1, wherein said $SiO_2$ powdery aluminum compound weight ratio is 1/10 to 4/1.

7. An inorganic film forming composition according to claim 1, wherein said powdery glass is at least one selected from the group consisting of powdery glass fibre and powdery glass flake.

8. An inorganic film forming composition according to claim 1, wherein said powdery glass average particle size is 3 to 50 $\mu$.

9. An inorganic film forming composition according to claim 1, wherein said powdery glass has a weight ratio of said powdery glass to said powdery aluminium compound of 1/40 to 5/1.

10. An inorganic film forming composition according to claim 9, wherein said weight ratio is 1/20 to 1/1.

11. An inorganic film forming composition according to claim 1 wherein said water soluble amine is monoethanolamine in a weight ratio of 1:3 to said silica, said powdery aluminum compound is alumina or calcium aluminum silicate, and wherein said powdery glass is powdered glass flakes in a weight ratio of 9-15:1 to said powdery aluminum compound.

12. An inorganic film forming composition according to claim 1 wherein said water soluble organic amine is isopropanolamine in a weight ratio of 1:2 to said silica, said water soluble amino acid is glycine in an amount of 2 weight percent based on said water, said water soluble salt is $Na_2MoO_4.2H_2O$ in a ratio of $Mo:SiO_2$ of 1:500, said powdery aluminum compound is alumina and said powdery glass is employed in a weight ratio of 2.4–12:1 to said powdery aluminum compound.

13. An inorganic film forming composition in accordance with claim 1 wherein said water soluble organic amine is ethylenediamine in a weight ratio of 1:1.5 to said silica, said water soluble amino acid is aminobutylic acid in an amount of 4 weight percent based on said water, said water soluble salt is $Na_2WO_4.2H_2O$ in a ratio of $W:SiO_2$ of 1:1000, said powdery aluminum compound is aluminum hydroxide, and said powdery glass is powdered glass flakes in a weight ratio of 3:1 to said powdery aluminum compound.

14. An inorganic film forming composition according to claim 1 wherein said water soluble organic amine is isopropanolamine in a weight ratio of 1:1 to said silica, said composition contains 5 weight percent urea based on the weight of said water, said water soluble salt is $(NH_4)_2CrO_4$ in a ratio of $Cr-SiO_2$ of 1:150, said powdery aluminum compound is aluminum silicate, and said powdery glass is powdered glass flake in a weight ratio of 30:1 to said powdery aluminum compound.

15. An inorganic film forming composition according to claim 1 wherein said water soluble organic amine is monoethanolamine in a weight ratio of 1:3 to said silica, said water soluble amino acid is glycine in an amount of 2 weight percent based on said water, said composition containing urea in an amount of 5 weight percent based on the weight of said water, thiourea in the amount of 5 weight percent based on the weight of said water, potassium chromate in a ratio of $Cr:SiO_2$ of 1:250, said powdery aluminum compound is potassium aluminum silicate, and said powdery glass is powdered glass fiber in a weight ratio of 9:1 to said powdery aluminum compound.

* * * * *